United States Patent [19]

Vezner

[11] Patent Number: 5,562,362
[45] Date of Patent: Oct. 8, 1996

[54] RETRACTABLE TRANSPORT WHEEL MECHANISM FOR BOAT LIFTS

[76] Inventor: Kenneth W. Vezner, 9138 Glen Edin La. North, Brooklyn Park, Minn. 55443

[21] Appl. No.: 533,557

[22] Filed: Sep. 25, 1995

[51] Int. Cl.⁶ .................... B63C 3/06; B60P 3/10
[52] U.S. Cl. .................................. 405/3; 114/44
[58] Field of Search .................. 405/3; 114/44, 114/51

[56] References Cited

U.S. PATENT DOCUMENTS

| | | | |
|---|---|---|---|
| 4,318,632 | 3/1982 | Fortmeyer | 405/3 |
| 5,238,324 | 8/1993 | Dettling, Jr. | 405/3 |
| 5,380,143 | 1/1995 | Mohan | 405/3 X |

FOREIGN PATENT DOCUMENTS 2130987  6/1984  United Kingdom ............ 114/44

*Primary Examiner*—David J. Bagnell

[57] ABSTRACT

Transport system for boat lifts which includes a plurality of wheeled strut assemblies for attachment to the operating struts of a conventional boat lift frame for controllable actuation with the operation of the boat lift to project the transport wheels downwardly into engagement with the surface of the ground and elevate the stationary supporting pads of the boat lift to permit transportation from one location to another.

5 Claims, 1 Drawing Sheet

U.S. Patent   Oct. 8, 1996   5,562,362
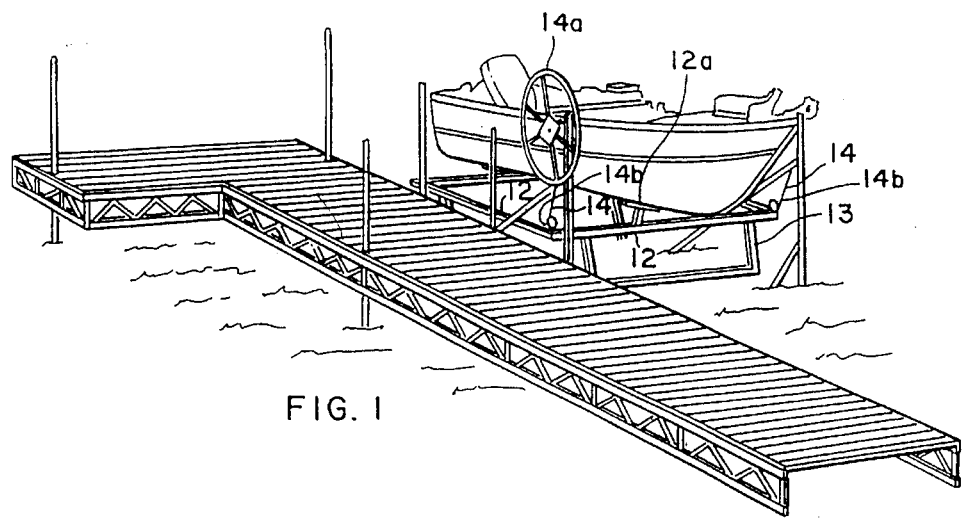
FIG. 1
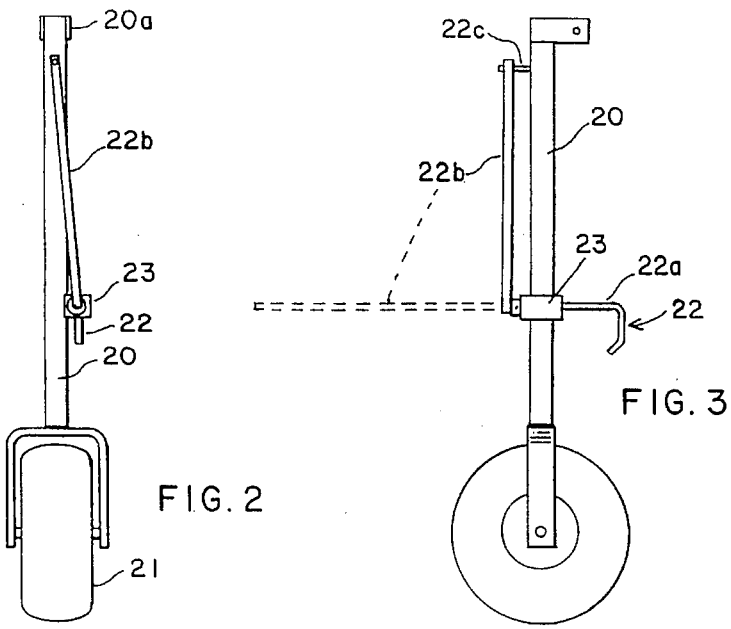
FIG. 2
FIG. 3
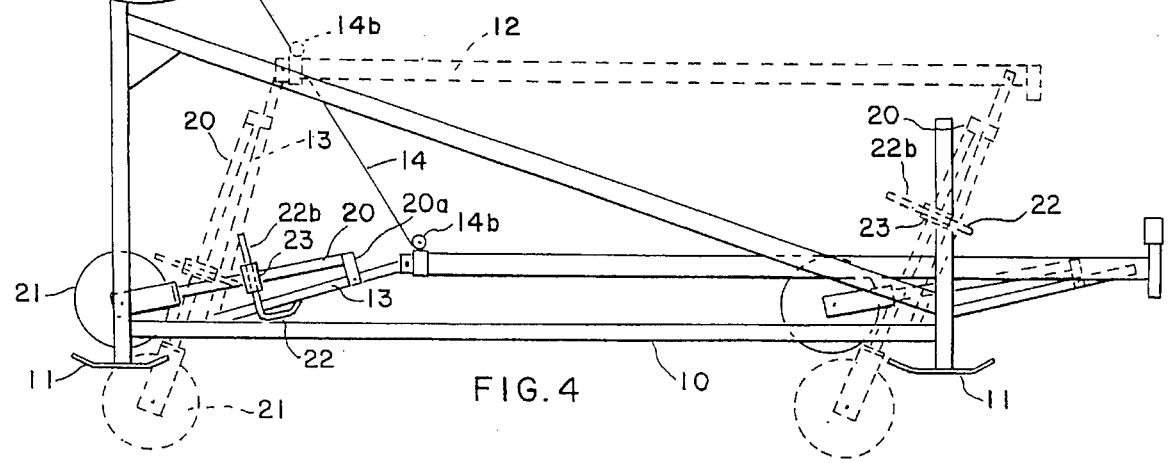
FIG. 4

5,562,362

RETRACTABLE TRANSPORT WHEEL MECHANISM FOR BOAT LIFTS

BACKGROUND OF THE INVENTION

Many small boat owners have dockside boat lifts for storing small alongside of a dock. The lift includes a cradle on which the boat is supported. This cradle is moved up and down by a lever arrangement which is responsive to a winch and cable mechanism for raising the boat out of the water when not in use. The bottom engaging pads or feet provide the desired stability during this operation. However, when it is desired to remove the lift structure from the water, it is desirable to provide transport wheels for elevating the support pads of the lift and to permit rolling the entire lift structure on the lake bottom and shore to facilitate removal of the lift from the water for winter storage as well as putting the lift into the water.

The most pertinent prior art known to applicant and his attorney is the U.S. Pat. No. 4,318,632 issued Mar. 9, 1982 to Fortmeyer. The Fortmeyer discloses a lift transport system which includes a pair of transport wheels each mounted on a pivoted supporting lever to which operating linkage is removably attached for projecting two transport wheels downwardly to raise the lift and support the same in raised position when it is desired to move the lift structure from one location to another. The stationary supporting pads that normally support the entire structure are elevated to facilitate moving the lift structure.

SUMMARY OF THE INVENTION

The present invention differs from the prior art by providing a disabling mechanism so that the wheels will normally be maintained in inoperative position above the lake bottom and permit the boat lift pads to be stably supported on the bottom for normal operation of the boat lift. One of the major advantages of applicant's present structure is the fact that the transport wheels are permanently attached to the lift struts but are only pivoted downwardly into operative position when the actuating linkage is rotated into engagement with the lift struts of the boat lift to move therewith into downwardly projected operative position. This lowers the wheels and raises the boat lift pads off the lake bottom.

DESCRIPTION OF THE DRAWINGS

FIG. 1 is a perspective view of a boat lift in operative position alongside a dock;

FIG. 2 is a front elevational view of the wheel strut assembly, per se;

FIG. 3 is a side elevational view of the wheel strut assembly shown in FIG. 2; and FIG. 4 is a side elevational view of the boat lift shown in FIG. 1 with the transport wheels embodying this invention mounted thereon and shown in raised inoperative position in full lines and in downwardly projected transport position.

DETAILED DESCRIPTION OF THE PREFERRED EMBODIMENT

A conventional boat lift is illustrated in FIGS. 1 and 4 and embodies a suitable stationary base frame 10 with suitable supporting pads 11 on the four corners thereof.

A boat supporting frame 12 is designed to engage the bottom of a boat for normal storage thereof at the dock site in the usual manner. Suitable lift struts 13 pivotally connect the base frame 10 to the boat supporting frame 12 in the conventional manner. A conventional cable takeup mechanism having a cable 14 is connected to the supporting frame 12 and is operated by a large wheel winch mechanism 14a in the conventional manner to raise and lower the boat on the frame 12. The cable 14 travels through a pair of pulleys 14b positioned at the corners of the frame 12 and provides a conventional takeup mechanism for the boat supporting frame 12 in a conventional manner.

Four wheel supporting struts 20 are respectively mounted on the corner lift struts 13 of the elevating structure and have wheels 21 journaled on the free ends thereof. The four struts 20 normally rest on the cross frame members of the base frame 10. This permits the lift structure to be operated in the normal manner when in use as a boat lift. When the boat lift is to be removed from the water, the winch mechanism 14a is operated to lower the upper frame 12 into its extreme down position as shown by full lines in FIG. 4. A connecting hook 22 is provided for connecting each strut 20 to the respectively adjacent lift struts 13 as best shown in FIG. 3. The hook 22 is fixed to a shaft 22a journaled in a bushing block 23 which is fixed to the strut 20. An actuating rod 22b is pin connected to the mounting rod of the hook 22 to permit the hook to be moved from inoperative position into operative position underlying the lift strut 13. With all of the hooks 22 in engagement with the respective lift strut elements 13, the winch mechanism 14a is operated to raise the boat supporting frame 12 and pivot the struts 13 into a more upright position as shown by the dotted lines in FIG. 4. This, of course, causes the wheel struts 20 to swing downwardly into engagement with the bottom of the lake and raise the lift pads 11 above the bottom and permit the entire unit to be supported on the four wheels 21 at the respective corners of the lift structure, thus facilitating moving the lift structure out of the water for winter storage. In the spring, of course, the entire lift structure is merely rolled back into the water adjacent to the dock and the hooks 22 rotated out of engagement with the lift struts 13 to permit operation of the boat lift in the normal way with the supporting pads 11 in engagement with the lake bottom. The hook operating rod 22a holds the hook 22 in inoperative position by having an anchoring pin 22c provided at the top at the free end thereof for engagement with a suitable hole provided in the upper portion of the strut 20.

What is claimed is:

1. A retractable transport wheel mechanism for use with a boat lift of the type having a base frame with underlying supporting pads for engagement with the bottom of a lake and including a boat supporting frame pivotally connected by elevating struts to the base frame and having a winch mechanism for raising and lowering the lift struts and the retractable transport wheel mechanism facilitating transfer of the boat lift into or out of the water, and comprising:

a plurality of wheel supporting struts adapted to be pivotally connected to the elevating struts of the boat lift for actuating movement with the elevating struts and including transport wheels mounted on the lower ends of the wheel supporting struts, means for disabling the pivotal connection between the wheel supporting struts and the elevating struts to prevent actuating movement of the wheel supporting struts during normal operation of the boat lift, and manual means for connecting the wheel supporting struts to the elevating struts of the boat lift for actuation therewith and projecting the transport wheels downwardly into bottom engaging position and thereby elevate the pads of the boat lift above the supporting surface and permit the boat lift structure to be moved on the ground engaging wheels.

2. The mechanism set forth in claim 1 wherein each of the wheel supporting struts includes a bushing member fixed to the boat lift elevating strut, a connecting hook pivotally mounted in the bushing to facilitate rotating the hook into and out of engagement with the elevating strut.

3. The mechanism set forth in claim 2 and a shank member fixed to said hook with an elongated actuating handle connected therewith for rotating the hook in the bushing into and out of engagement with the elevating strut.

4. In combination, a boat lift and retractable transport wheel mechanism comprising:

a base with a plurality of supporting pads adapted to engage the lake bottom when the lift is in operation, elevating struts pivotally mounted on the base frame with a boat supporting frame for supporting a boat thereon and including a hoisting mechanism for raising and lowering the elevating struts, wheel supporting struts with wheels thereon and pivotally mounted on the elevating struts and constructed to permit the same to be inoperative during normal operation of the lift structure and means for releasably connecting the wheel supporting struts to the elevating struts for actuation therewith and to project the wheels downwardly into engagement with the lake bottom to elevate the boat lift above the lake bottom and thereby permit the entire boat lift unit to be moved on the wheel elements.

5. The combinature set forth in claim 4 and each of said hook elements being axially rotatable into and out of strut engaging position and including an operating handle pivotally mounted on the mounting shaft of the hook element to facilitate rotation of the hook element into and out of engagement with the strut element.

\* \* \* \* \*